(12) United States Patent
Cockcroft et al.

(10) Patent No.: US 7,771,548 B2
(45) Date of Patent: Aug. 10, 2010

(54) METAL QUENCHING MEDIUM

(75) Inventors: Robert Cockcroft, Bradford (GB);
David Petty, Bradford (GB); Frank J. L. Leroy, Quillebeuf sur Seine (FR);
Francis Mark Prince, Le Havre (FR);
Nils Hoeck, Muellheim (DE); Paul Guedj, Savigny le Temple (FR)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 12/623,596

(22) Filed: Nov. 23, 2009

(65) Prior Publication Data

US 2010/0065169 A1 Mar. 18, 2010

Related U.S. Application Data

(62) Division of application No. 11/429,784, filed on May 8, 2006, now abandoned.

(60) Provisional application No. 60/679,485, filed on May 10, 2005.

(51) Int. Cl.
*C21D 9/00* (2006.01)
*C09K 5/00* (2006.01)

(52) U.S. Cl. .................. 148/559; 148/28; 148/638; 252/79

(58) Field of Classification Search .............. 148/28, 148/559, 638; 252/79
See application file for complete search history.

(56) References Cited

U.S. PATENT DOCUMENTS

| 3,939,016 | A |  | 2/1976  | Tokuue et al. |
| 3,996,076 | A |  | 12/1976 | Tokuue et al. |
| 4,381,205 | A |  | 4/1983  | Warchol |
| 4,892,916 | A | * | 1/1990 | Hawe et al. ............ 526/304 |
| 5,766,505 | A |  | 6/1998  | Kanamori et al. |
| 6,648,997 | B2 |  | 11/2003 | Stratton |
| 6,689,227 | B2 |  | 2/2004  | Sahay |
| 2005/0209382 | A1 | * | 9/2005 | Yale et al. ............ 524/379 |

FOREIGN PATENT DOCUMENTS

| EP | 0216479 |   | 4/1987 |
| JP | 2004-27208 | * | 1/2004 |
| WO | 2005090503 |   | 9/2005 |

* cited by examiner

*Primary Examiner*—Helen L Pezzuto
(74) *Attorney, Agent, or Firm*—Tyler A. Stevenson

(57) ABSTRACT

Disclosed is a quenching medium for treating a heated metal part, said medium comprising water and a polyacrylate terpolymer comprising acrylamide and/or methacrylamide monomer units, acrylic acid and/or methacrylic acid monomer units and alkyl alkoxylate allyl ether monomer units where the acid groups are in the form of an alkali metal salt and where the alkyl alkoxylate allyl ether monomers are of the formula

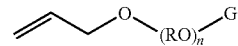

where n is an integer from 1 to about 30, R is ethylene, propylene or butylene and G is an alkyl group of 8 to 30 carbon atoms. Also disclosed is a method for quenching a heated metal part, which process comprises immersing said metal part in the quenching medium. Also disclosed are the polyacrylate ternary copolymers.

10 Claims, No Drawings

METAL QUENCHING MEDIUM

This application is a divisional of application Ser. No. 11/429,784, filed May 8, 2006, abandoned, which claims benefit under 35 USC 119(e) of U.S. provisional app. No. 60/679,485, filed May 10, 2005, which applications are incorporated by reference.

The present invention is aimed at providing a metal quenching medium. The aqueous medium may be used to quench for example steel and aluminum alloys. The aqueous medium comprises a terpolymer of i) acrylamide and/or methacrylamide, ii) acrylic acid and/or methacrylic acid and iii) one or more hydrophobic alkyl alkoxylate allyl ethers.

BACKGROUND OF THE INVENTION

Significant efforts have been invested in developing aqueous quenching media. Such aqueous quenching media, or quenchant media, comprise water compatible polymers, for example starch, alkylene oxide polymers or polyacrylates.

Such quenching media are disclosed for example in U.S. Pat. Nos. 6,689,227, 4,381,205 and 5,766,505.

U.S. Pat. Nos. 3,939,016 and 3,996,076 teach the use of a aqueous quenching medium that comprises polyacrylic acid, polymethacrylic acid, a copolymer of acrylic acid and methacrylic acid or a salt thereof.

Surprisingly, it has been found that certain hydrophobically modified polyacrylate copolymers provide for an excellent aqueous metal quenching medium.

SUMMARY OF THE INVENTION

Disclosed is a quenching medium for treating a heated metal part, said medium comprising
water and
a polyacrylate terpolymer comprising
acrylamide and/or methacrylamide monomer units,
acrylic acid and/or methacrylic acid monomer units and
alkyl alkoxylate allyl ether monomer units,
where the acid groups are in the form of an alkali metal salt and
where the alkyl alkoxylate allyl ether monomers are of the formula

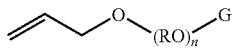

where n is an integer from 1 to about 30, R is ethylene, propylene or butylene and G is an alkyl group of 8 to 30 carbon atoms.

Also disclosed is a process for quenching a heated metal part, which process comprises preparing a quenching medium comprising
water and
a polyacrylate terpolymer comprising
acrylamide and/or methacrylamide monomer units,
acrylic acid and/or methacrylic acid monomer units and
alkyl alkoxylate allyl ether monomer units,
where the acid groups are in the form of an alkali metal salt and
where the alkyl alkoxylate allyl ether monomers are of the formula

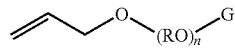

where n is an integer from 1 to about 30, R is ethylene, propylene or butylene and G is an alkyl group of 8 to 30 carbon atoms and
immersing the heated metal part in the quenching medium for a period of time to accomplish the quenching.

Also disclosed are the polyacrylate terpolymers. In the polyacrylate terpolymers, the acid groups are in the acid form or are in the form of an alkali metal salt.

DETAILED DISCLOSURE

The alkyl alkoxylate allyl ethers are for example alkyl ethoxylate allyl ethers, alkyl propoxylate allyl ethers, alkyl butoxylate allyl ethers or are mixtures of alkoxylates.

The alkyl alkoxylate allyl ether monomers are represented as

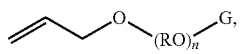

and are hydrophobically modified by virtue of the group G, an alkyl group of 8 to 30 carbon atoms.

Ethylene is 1,2-ethylene. Propylene is 1,2- or 1,3-propylene. Butyl is 1,2-, 1,3- or 1,4-butylene.

Alkyl is straight or branched chain. Alkyl is for example 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl, docosyl and so on.

For example, R is 1,2-ethylene, n is an integer from about 10 to about 20 and the alkyl group G has 12 to 24 carbon atoms. For example, the group G is stearyl. For example, the alkyl alkoxylate allyl ethers are 10 mol (n=10) ethoxylates or are 20 mol ethoxylates.

The weight:weight ratio of acrylamide and/or methacrylamide:acrylic acid and/or methacrylic acid monomer units in the terpolymer is from about 9:1 to about 1:9, for example from about 7:1 to about 1:7, from about 5:1 to about 1:5, from about 4:1 to about 1:4, from about 3:1 to about 1:3 or is from about 2:1 to about 1:2. For instance, the weight:weight ratio of acrylamide and/or methacrylamide:acrylic acid and/or methacrylic acid monomer units is from about 2:1 to about 3:1.

The alkyl alkoxylate allyl ether monomer units make up to about 25 weight % of the monomer units of the terpolymer, for example up to about 15%, up to about 12%, up to about 10%, or up to about 5 weight %.

Examples of the make-up of the terpolymer, by weight, are 65:30:5 acrylamide:acrylic acid:alkyl alkoxylate allyl ether and 20:70:10 acrylamide:acrylic acid:alkyl alkoxylate allyl ether. Acrylamide and acrylic acid may be partially or fully substituted by methacrylamide and methacrylic acid respectively.

The acrylic acid units of the terpolymer are in the form of an alkali metal salt, via neutralization with an alkali metal hydroxide. The alkali metal is for example sodium or potassium.

The terpolymer has a weight average molecular weight of between about 10,000 and about 100,000, for example between about 20,000 and about 80,000, for example between about 30,000 and about 70,000, for example between about 40,000 and about 50,000.

The present terpolymers are prepared by free radical polymerization.

The term "comprising monomer units" means the monomer units in their polymerized form.

The quenching medium comprises a solution of the terpolymer in water. The terpolymer makes up between about 0.5% and about 15% by weight of the quenching medium, for example between about 1% and about 12% by weight of the quenching medium, for instance between about 3% and about 7% by weight. These levels are lower than conventional polymer quenchants.

The terpolymer may be stored as a concentrated aqueous solution, which may be diluted to prepare the quenching medium. The terpolymer makes up to about 50% by weight of the concentrated solution. For instance, the terpolymer makes up to about 40% by weight of the concentrated solution, for example the terpolymer is between about 10% and about 40% by weight of the concentrated solution, for instance is between about 30% and about 40% by weight of the concentrated solution.

Metals suitable for quenching in the present medium are for example tool steels and aluminium alloys. That is, the metals are for example steel, alloy steel, aluminium or aluminium alloys. The metal objects are cooled in the present medium by thermal quenching from a temperature for example of about 850° C. or above to a temperature of less than about 100° C.

For example, the immersion takes place with the quenching medium at about room temperature.

Advantageously, the present terpolymers are employed together with non-hydrophobically modified (acrylamide and/or methacrylamide)/(acrylic acid and/or methacrylic acid) copolymers, or with other known metal quenching polymers such as poly(alkylene oxide) polymers, polyacrylates, polyvinylpyrrolidone or polyethyloxazoline.

The present quenching medium may comprise other conventional additives, for example those disclosed in U.S. Pat. Nos. 6,689,227, 4,381,205, 5,766,505, 3,939,016 and 3,996,076, the disclosures of which are hereby incorporated by reference. Such optional additives include corrosion inhibitors, rust inhibitors, copper deactivators, antioxidants, silicone defoaming agents, colorants, preservatives such as formaldehyde, and dissolved carbon dioxide.

The present quenching medium provides an enhanced cooling rate profile similar to that known from mineral oil quenching baths. Upon selection of a certain present terpolymer and certain treat rate, it is possible to harden low alloyed steel to achieve hardness properties formerly only known from highly alloyed steel. Simultaneously, the quenching behavior avoids brittleness of the tool steel. The advantageous cooling profile allows a better deep-hardening of the steel tool when compared to other known aqueous quenching technologies. Further, the drag-out of polymer from the bath when removing the steel tool is significantly reduced.

The following Examples further illustrate the invention. Unless otherwise indicated, parts and percentages are by weight.

PREPARATIVE EXAMPLE 1

To a resin pot equipped with a mechanical stirrer, a condenser arranged to reflux, a thermometer and an inlet for gradual addition of monomer and initiator is added 2476 g of water. Two separate feeds are prepared, a monomer feed comprising of 682.8 g of water, 1356.3 g of acrylamide @ 51.61%, 373.2 g of acrylic acid @ 80.38%, 4.2 g of TETRALON A @ 6% and 4.8 g of sodium hypophosphite monohydrate and an initiator feed comprising of 2.5 g of ammonium persulphate dissolved in 100 g of water. TETRALON A is an aqueous solution of the sodium salt of ethylene diamine tetraacetic acid.

The resin pot contents are brought to reflux by using a heated oil bath, then 1 mL of a 10% ammonium persulphate solution is added, followed by separate addition of the monomer and initiator solutions at a constant controlled rate using peristaltic pumps. The monomer is added over a period of 2 hours and the initiator solution over 2.5 hours whilst maintaining reflux throughout the polymerization. On completion of the additions reflux is maintained for a further 30 minutes after which the polymerized mass is cooled to 40° C. and neutralized to approximately pH 7 with 50% potassium hydroxide solution. The resulting polymer has a solids content of 31.2% and a weight average molecular weight of 89400 as measured by gel permeation chromatography.

PREPARATIVE EXAMPLE 2

To a resin pot equipped with a mechanical stirrer, a condenser arranged to reflux, a thermometer and an inlet for gradual addition of monomer and initiator is added 1200 g of industrial methylated spirit and 42 g of stearyl 20 mol ethoxylate allyl ether. Two separate feeds are prepared, a monomer feed comprising of 1318.5 g of water, 286.8 g of acrylic acid @ 83.68%, 1003.7 g of acrylamide @ 51.61% and 3.3 g of TETRALON A @ 6% and an initiator feed comprising of 1.24 g of ammonium persulphate dissolved in 100 g of water.

The resin pot contents are brought to reflux by using a heated oil bath and 7.6 mLs of a 10% ammonium persulphate solution are added followed by separate addition of the monomer and initiator solutions at a constant controlled rate using peristaltic pumps. The monomer is added over a period of 2 hours and the initiator solution over 2.5 hours whilst maintaining reflux throughout the polymerization. On completion of the additions reflux is maintained for a further 30 minutes prior to removal of the ethanol by vacuum distillation. The remaining aqueous polymer solution is adjusted to approximately pH 7 with a 50% aqueous solution of potassium hydroxide. This results in a polymer with a solids content of 38.6% and a weight average molecular weight as measured by gel permeation chromatography of 43600.

PREPARATIVE EXAMPLE 3

Using the procedure and apparatus as described in Preparative Example 2 the experiment is repeated except that 42 g of stearyl 10 mol ethoxylate allyl ether is employed as the hydrophobic monomer.

Aqueous metal quenching compositions are prepared from the polymers produced in Preparative Examples 1-3.

Application Experiments

Typical Quenching Medium Formulation is as Follows (100 wt % Total):

| | |
|---|---|
| Polymer | 5 wt % |
| Sodium Isofol Sulphate surfactant | 0.05 wt % |
| Sodium Chloride | 2 wt % |
| Water | remainder |

Quenchant tests are based on ISO 9950 (=IP 414) standard using an Inconel 600 cylindrical probe/Drasticimeter Peckly with an initial probe temperature of 850° C. and a quenchant bath temperature of 40° C. A pumped agitation system is used to ensure a homogeneous turbulent flow of quenchant around the probe. The maximum cooling rate and the cooling rate at 300° C. are measured with a circulation rate of 800 Liters per hour.

| Quenching medium comprising polymer of | Max Cooling ° C./second | Cooling @ 300° C. ° C./second |
| --- | --- | --- |
| Example 1 (control) | 135 | 70 |
| Example 2 | 135 | 16 |
| Example 3 | 166 | 21 |
| Example 1 + 2 70:30 blend | 115 | 13 |

The polymer produced in Example 1 serves as a control and is typical of acrylate quenching polymers currently available. The modified polymers of Examples 2 and 3 demonstrate the maximum cooling rate is maintained but a significant reduction in cooling rate at 300° C. is observed enabling the polymers to be suitable for high hardenability quenching.

A synergistic effect is also observed on mixing the modified polymers with the control.

What is claimed is:

1. A process for quenching a heated metal part, which process comprises
   preparing a quenching medium comprising
      water and
      a polyacrylate terpolymer comprising
         acrylamide and/or methacrylamide monomer units,
         acrylic acid and/or methacrylic acid monomer units and
         alkyl alkoxylate allyl ether monomer units,
         where the acid groups are in the form of an alkali metal salt and
         where the alkyl alkoxylate allyl ether monomers are of the formula

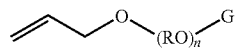

where n is an integer from 1 to about 30, R is ethylene, propylene or butylene and G is an alkyl group of 8 to 30 carbon atoms and
   immersing the heated metal part in the quenching medium for a period of time to accomplish the quenching.

2. A process according to claim 1 where R is 1,2-ethylene or 1,2-propylene.

3. A process according to claim 1 where n is from about 10 to about 20 and G is an alkyl group of 12 to 24 carbon atoms.

4. A process according to claim 1 where the weight: weight ratio of acrylamide and/or methacrylamide to acrylic acid and/or methacrylic acid monomer units is from about 4:1 to about 1:4.

5. A process according to claim 1 where the weight: weight ratio of acrylamide and/or methacrylamide to acrylic acid and/or methacrylic acid monomer units is from about 2:1 to about 3:1.

6. A process according to claim 1 where the alkyl alkoxylate allyl ether monomer units are up to about 10% by weight of the terpolymer.

7. A process according to claim 1 where the alkyl alkoxylate allyl ether monomer units are up to about 5% by weight of the terpolymer.

8. A process according to claim 1 where the terpolymer has a weight average molecular weight of between about 20,000 and about 80,000.

9. A process according to claim 1 where the terpolymer is between about 0.5% and about 15% of the medium by weight.

10. A process according to claim 1 where the medium further comprises a polymer selected from the group consisting of (acrylamide and/or methacrylamide)/(acrylic acid and/or methacrylic acid) copolymers, poly(alkylene oxide) polymers, polyacrylates, polyvinylpyrrolidone and polyethyloxazoline.

* * * * *